Figure 1:
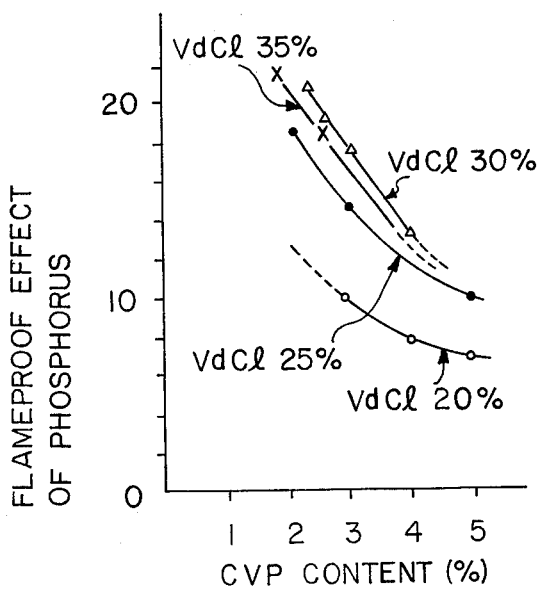

United States Patent [19]

Shichijo et al.

[11] 3,931,120

[45] Jan. 6, 1976

[54] FLAMEPROOF MODACRYLIC FIBERS

[75] Inventors: Yoshihisa Shichijo; Hideo Sato; Toshio Iwasa; Yasuo Uchida, all of Fuji, Japan

[73] Assignee: Asahi Kasei Kogyo Kabushiki Kaisha, Tokyo, Japan

[22] Filed: Sept. 26, 1973

[21] Appl. No.: 400,801

Related U.S. Application Data

[62] Division of Ser. No. 196,100, Nov. 5, 1971, Pat. No. 3,824,222.

[30] Foreign Application Priority Data

Nov. 5, 1970 Japan................................ 45-96831

[52] U.S. Cl..................... 260/79.3 MU; 260/29.6 T; 260/29.6 MN; 260/29.6 TA; 260/80.71; 260/85.5 XA

[51] Int. Cl.².................. C08F 28/02; C08F 230/02

[58] Field of Search ................. 260/79.3 MU, 80.71

[56] References Cited

UNITED STATES PATENTS 3,077,418    2/1963   Kenaga................................ 117/59

Primary Examiner—Harold D. Anderson
Attorney, Agent, or Firm—Armstrong, Nikaido & Wegner

[57] ABSTRACT

Modacrylic fibers having excellent flameproof property and retaining the superior whiteness, heat-stability, etc. of Acrylonitrile polymer fibers are produced from the polymers containing, as principal components, 50 percent by weight or more of acrylonitrile, 25 percent by weight of more of vinylidene chloride and 0.1–3 percent by weight of bis(2-chloroethyl) vinylphosphonate, and if necessary, as additional component, at least one copolymerizable ethylenically unsaturated compound.

4 Claims, 6 Drawing Figures

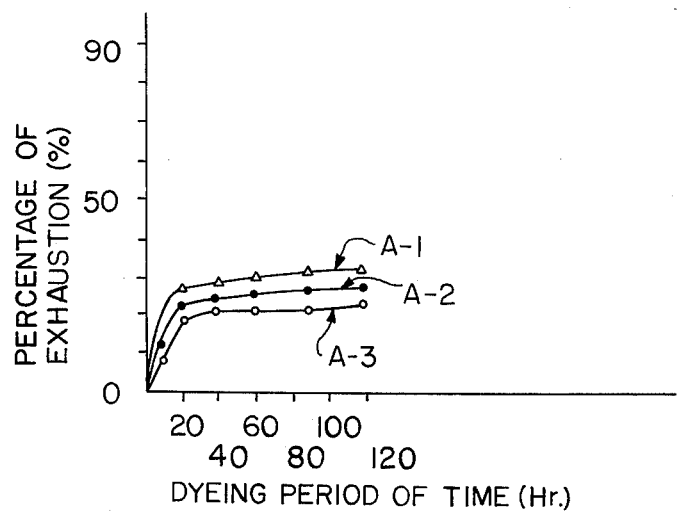
FIG. 4
FIG. 5
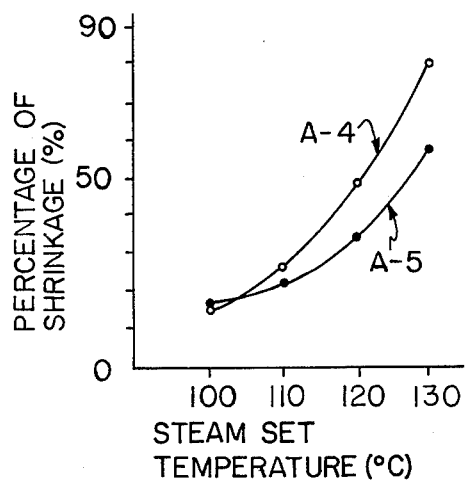
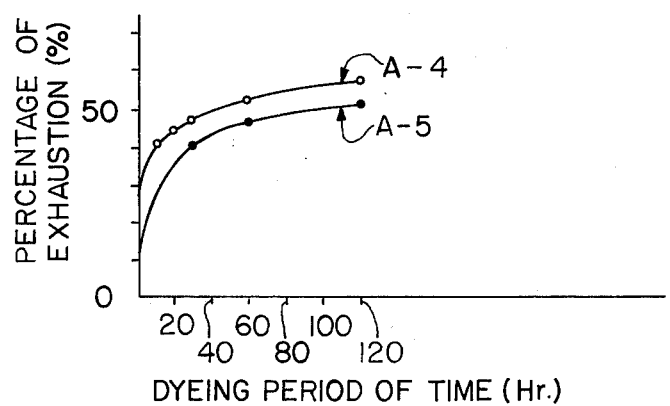
FIG. 6

FLAMEPROOF MODACRYLIC FIBERS

This is a division, of application Ser. No. 196,100, filed Nov. 5, 1971, now U.S. Pat. No. 3,824,222.

This invention relates to novel flameproof modacrylic fibers. More particularly it relates to novel flameproof modacrylic fibers prepared from 50 percent by weight or more of acrylonitrile, 25 percent by weight or more of vinylidene chloride and 0.1 - 3 percent by weight of bis(2-chloroethyl) vinylphosphonate as principal components, and at least one copolymerizable ethylenically unsaturated compound as additional component, if necessary.

Attempts to give fibers flameproof property have been made heretofore by various ways. For example, there are methods in which an organic halogen compound, an organic halogen-containing phosphorous compound, an inorganic substance such as antimony oxide, boric acid, or the like is incorporated in or attached on fibers as a flameproof agent. However, in these methods, a large amount of the above-mentioned substance must be incorporated in order to give sufficient flameproof property. This often gives undesirable influence upon the properties, handle, dyeability, etc. Furthermore, even when it is incorporated with great pains, it often comes off during the time of after-treatment such as dyeing, scouring, etc., and hence there remains the problem of durability of flameproof property.

On the other hand, as a method for affording a durable flameproof property, copolymerization of acrylonitrile with a halogen-containing vinyl monomer e.g. vinyl chloride or vinylidene chloride, has been carried out. In this case, the object can be attained by using a large amount of monomer but it is said that incorporation of more than 30 percent by weight of chlorine into a polymer is necessary in order to obtain satisfactory flameproof grade in general. For this purpose, incorporation of about 53 percent by weight or more of vinyl chloride or about 41 percent by weight or more of vinylidene chloride is necessary. Further, depending upon a spinning solvent used, it is often attempted to incorporate vinyl chloride or vinylidene chloride in an amount more than that in order to increase solubility.

Modacrylic fibers of vinyl chloride-acrylonitrile copolymer improves flameproof properties a great deal but resultant fibers have a lower sticking point, and show a large shrinkage at a higher temperature, hence they are not suitable to most of the utility in spinning and weaving field. For example, when 20 - 40 percent of vinyl chloride is copolymerized with acrylonitrile, flameproof property is greatly elevated but its sticking point becomes lower than 150°C and a considerable shrinkage occurs in boiling water. In contrast, the sticking point of acrylonitrile polymer synthetic fibers is 200°C and shows shrinkage of only 5 percent in water. Accordingly, modacrylic fibers of vinyl chloride-acrylonitrile copolymer are used only in the field where the most flameproof property is required, e.g. carpet, curtain, etc.

On the other hand, modacrylic fibers of vinylidene chloride-acrylonitrile copolymer have superior heat-resistance. Compared with polyacrylonitrile, incorporation of 7 percent by weight of vinylidene chloride elevates the second order transition point of polyacrylonitrile from 87°C to 110°C and incorporation of 30 percent by weight of vinylidene chloride elevates it to 135°C. The higher the second order transition point, the higher the resistance to deformation caused by an outer force at a higher temperature. On the other hand, the dyeing becomes much difficult and the fastness of dyed products becomes lower with the increase of the second order transition point. Moreover modacrylic fibers of vinylidene chloride-acrylonitrile copolymer are inferior in light-fastness and their utilities are limited on this account.

We have paid our attention to the facts that (1) in order to give sufficient flameproof property to modacrylic fibers of vinylidene chloride-acrylonitrile copolymer, copolymerization with 41 percent by weight or more of vinylidene chloride would be sufficient, and (2) with the increase of the acrylonitrile content of polymer in modacrylic fibers, properties become closer to acrylonitrile polymer synthetic fibers and most properties such as dyeability, resistance to thermal decomposition, light-fastness, etc. are improved, and have repeated the study on the production of vinylidene chloride type synthetic fibers containing 50 percent by weight or more of acrylonitrile. In this case, however, an inexpensive readily available solvent such as acetone can not be used and a special solvent such as dimethyl formamide must be used. This has become a difficult point.

However, we have found that superior flameproof modacrylic fibers whose whiteness, heat-stability, etc. are not inferior to acrylonitrile polymer fibers can be produced by preparing a polymer having a uniform distribution of composition by way of a continuous emulsion polymerization, a continuous suspension polymerization, a solution polymerization, etc., dissolving it in a concentrated aqueous solution of nitric acid to prepare a transparent colorless spinning solution, and extruding the spinning solution into a coagulation bath of an aqueous solution of nitric acid, followed by stretching and drying. However, the fibers comprising acrylonitrile (AN)-vinylidene chloride (VdCl)-copolymer containing 40-45 percent by weight of vinylidene chloride are less thermally-shrinkable, inferior in dyeability and dying-fastness and require the use of a nitric acid having a concentration considerably higher than that of the azeotropic mixture of nitric acid and water in dissolving as evident from Table 1.

Table 1

| Compostion of AN-VdCl copolymer (% by weight) | | Minimum concentration of nitric acid capable of dissolving the copolymer (%)* |
|---|---|---|
| 50 | 50 | 82 |
| 55 | 45 | 80 |
| 60 | 40 | 78 |
| 65 | 35 | 73 |
| 70 | 30 | 67 |
| 75 | 25 | 65 |

*1 g copolymer/10 cc nitric acid at 20°C

Accordingly, there is a drawback in the point that a large amount of concentrated nitric acid is required for the control of solvent which is extremely expensive.

After our strenuous study for solving the abovementioned drawbacks, we have found that even a small content of vinylidene chloride can give sufficient flameproof properties and completed the present invention.

Namely fibers having superior flameproof property have been obtained by copolymerizing about 0.1 to 3 percent by weight of a phosphorus-containing monomer having a general formula of

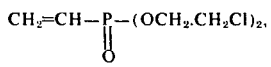

bis(2-chloroethyl) vinylphosphonate (which will be hereinafter abbreviated to CVP), with acrylonitrile and vinylidene chloride.

The CVP monomer, when it is solely incorporated in acrylonitrile and copolymerized therewith in an amount of 20 to 40 percent by weight, the flameproof property of the resultant fibers is insufficient but when it is incorporated simultaneously with vinylidene chloride in acrylonitrile and copolymerized therewith, extremely superior flameproof property can be realized.

It is believed that this is due to the synergistic effect of chlorine atom and phosphorus atom in a polymer and it has been confirmed that this synergistic effect of CVP monomer and VdCl monomer is particularly pronounced when the content of VdCl monomer is 25 percent by weight or more and that of CVP monomer is about 2 – 3 percent by weight.

Now the experimental results of flameproof properties of modacrylic fibers of acrylonitrile-vinylidene chloride-copolymer and of acrylonitrile-vinylidene chloride-CVP-copolymer are shown in Tables 2 and 3.

In these experiments, the measurements were carried out according to a following procedure (JIS 45° coil process)

i. As specimens, yarns of 15 cm length and 2 g weight were used.

ii. A position of flame was fixed and specimens were allowed to contact with the flame until burning started (Period time of contact with flame). When the burning started, the flame was removed and the duration time of remaining flame was determined (Duration time of remaining flame).

iii. When the fire was self-extinguished on the way, the flame was again contacted with the lower end of the specimen and the same procedure was continued (Number of times of contact with flame).

iv. The same procedures were repeated until the specimen was completely burnt down to nothing. The number of times of contact with flame was recorded. The standards of evaluation are as follows:

i. Period of time of contact with flame: the longer the period of time of contact with flame, the more difficult to catch fire.

ii. Duration time of remaining flame and number of times of contact with flame: the greater the number of times of contact with flame and the shorter the duration time of remaining flame, the better the flameproof property, while the smaller the number of times of contact with flame and the longer the duration time of remaining flame, the worse the flameproof property.

To cath fire easily and to be fast in burning speed mean that self-extinction is difficult. When the number of times of contact with flame is small and the duration time of remaining flame is longer, the specimen is slow in burning speed and difficult to be self-extinguished. When the number of times of contact with flame is large and the duration time of remaining flame is longer, the flame does not shift and the specimen is self-extinguished. In such a case, burning speed is slow and the specimen burns slowly at one spot.

Table 2

Flameproof properties of modacrylic fibers of AN-VdCl copolymer

| Specimen No. | Copolymer composition (% by weight) AN | VdCl | Chlorine content of copolymer (% by weight) | Period of time of contact with flame (sec.) | Duration time of remaining flame (sec.) | Number of times of contact with flame |
| --- | --- | --- | --- | --- | --- | --- |
| 1 | 54.8 | 45.2 | 33.1 | 9.5 | 1.0 | 15 |
| 2 | 59.8 | 40.2 | 29.4 | 7.3 | 3.0 | 10 |
| 3 | 66.2 | 33.8 | 24.7 | 5.0 | 9.8 | 9 |
| 4 | 69.3 | 30.7 | 22.5 | 5.8 | 34.0 | 5 |
| 5 | 75.0 | 25.0 | 18.3 | 4.0 | 185.0 | 1 |
| 6 | 100.0 | — | — | 3.0 | 84.0 | 1 |

Table 3

Flameproof properties of modacrylic fibers of AN-CVP-copolymer and of AN-VdCl-CVP-copolymer

| Specimen No. | Copolymer composition (% by weight) VdCl | CVP | In copolymer Cl content % | P content % | Period of time of contact with flame (sec.) | Duration time of remaining flame (sec.) | Number of time of contact with flame |
| --- | --- | --- | --- | --- | --- | --- | --- |
| 7 | — | 19.2 | 5.9 | 2.6 | 6.0 | 32.0 | 3 |
| 8 | — | 25.6 | 7.8 | 3.4 | 6.5 | 27.0 | 4 |
| 9 | — | 33.0 | 10.1 | 4.4 | 7.3 | 21.0 | 6 |
| 10 | 5.5 | 26.0 | 11.9 | 3.5 | 7.0 | 10.2 | 8 |
| 11 | 4.9 | 29.8 | 12.7 | 4.0 | 8.1 | 7.3 | 10 |
| 12 | 20.4 | 3.1 | 15.8 | 0.41 | 4.1 | 85.0 | 3 |
| 13 | 19.8 | 4.0 | 15.7 | 0.53 | 5.0 | 60.5 | 4 |
| 14 | 20.6 | 5.1 | 16.7 | 0.68 | 4.7 | 37.0 | 4 |
| 15 | 25.2 | 2.1 | 19.0 | 0.28 | 4.1 | 11.2 | 7 |
| 16 | 24.9 | 3.0 | 19.1 | 0.40 | 5.0 | 9.9 | 9 |
| 17 | 24.3 | 3.6 | 18.9 | 0.48 | 5.2 | 7.3 | 9 |
| 18 | 25.0 | 5.0 | 19.8 | 0.67 | 5.3 | 5.1 | 10 |
| 19 | 30.2 | 2.3 | 22.8 | 0.31 | 5.0 | 3.0 | 11 |
| 20 | 30.6 | 2.5 | 23.2 | 0.33 | 4.6 | 3.1 | 11 |
| 21 | 29.8 | 3.1 | 22.7 | 0.41 | 5.1 | 2.8 | 12 |
| 22 | 30.9 | 4.0 | 23.8 | 0.53 | 8.0 | 2.7 | 12 |
| 23 | 35.1 | 1.2 | 26.1 | 0.16 | 7.0 | 2.9 | 12 |
| 24 | 35.0 | 2.6 | 26.4 | 0.35 | 9.5 | 2.0 | 14 |
| 25 | 34.8 | 3.1 | 26.4 | 0.41 | 11.2 | 1.0 | 15 |
| 26 | 35.2 | 4.0 | 27.0 | 0.53 | 15.7 | less than 1.0 | 18 |

In order to compare the flameproof effect of CVP it was inferred to what kinds of modacrylic fibers of AN-VdCl copolymer, each of modacrylic fibers of AN-VdCl-CVP copolymer corresponds in their flameproof effect, and the results are summarized in Table 4.

This inference was carried out by investigating which composition of two component fibers consisting of AN-VdCl copolymer in Table 2, a given composition of the three component fibers consisting of AN-VdCl-CVP copolymer shown in Table 3 is close to. Namely for example, according to Table 3, the period of time of contact with flame, duration time of remaining flame and number of times of contact with flame of No. 15 are respectively, 4.1, 11.2 and 7. Whereas according to Table 2, the period of time of contact with flame, duration time of remaining flame and number of time of contact with flame of No. 3 (VdCl content: 33.8 percent) are respectively 5.0, 9.8 and 9 and those of No. 4 (VdCl content: 30.7 percent) are respectively 5.8, 34.0 and 5. Thus the flameproof property of No. 15 (three component fibers) is thus inferred to correspond to that of the two component fibers whose VdCl content is 33 percent. Similarily the flameproof property of No 19 (three component fibers) is inferred to correspond to that of the two component fibers whose VdCl content is 40 percent, and the flameproof property of No. 22 (three component fibers) is inferred to that of the two component fibers whose VdCl content is 42 percent. By the similar procedure, the compositions of corresponding AN-VdCl synthetic fibers were determined and results are shown in Table 4.

Next, the flameproof effects of phosphorus in contrast to chlorine were expressed by A-C/B, as seen in Table 4, wherein A is a Cl content of AN-VdCl-CVP fibers (%); B is a P content of AN-VdCl-CVP fibers (%); and C is a Cl content of AN-VdCl fibers (%).

Table 4

Comparison of flameproof properties of AN-VdCl-CVP modacrylic fibers with those of AN-VdCl modacrylic fibers

| Specimen No. | Composition of AN-VdCl-CVP synthetic fibers | | | | Composition of corresponding AN-VdCl synthetic fibers | | Flameproof effect of P in contrast to Cl $(\frac{C-A}{B})$ |
|---|---|---|---|---|---|---|---|
| | VdCl (% by weight) | CVP (% by weight) | Cl content (A %) | P content (B %) | VdCl (% by weight) | Cl content (C %) | |
| 10 | 5.5 | 26.0 | 11.9 | 3.5 | 32 | 23.4 | 3.3 |
| 11 | 4.9 | 29.8 | 12.7 | 4.0 | 40 | 29.3 | 4.2 |
| 12 | 20.4 | 3.1 | 15.8 | 0.41 | 27 | 19.8 | 9.8 |
| 13 | 19.8 | 4.0 | 15.7 | 0.53 | 27 | 19.8 | 7.7 |
| 14 | 20.6 | 5.1 | 16.7 | 0.68 | 29 | 21.2 | 6.6 |
| 15 | 25.2 | 2.1 | 19.0 | 0.28 | 33 | 24.2 | 18.4 |
| 16 | 24.9 | 3.0 | 19.1 | 0.40 | 34 | 24.9 | 14.5 |
| 17 | 24.3 | 3.6 | 18.9 | 0.48 | 35 | 25.6 | 14.0 |
| 18 | 25.0 | 5.0 | 19.8 | 0.67 | 36 | 26.4 | 9.8 |
| 19 | 30.2 | 2.3 | 22.8 | 0.31 | 40 | 29.3 | 21.0 |
| 20 | 30.6 | 2.5 | 23.2 | 0.33 | 40 | 29.3 | 18.5 |
| 21 | 29.8 | 3.1 | 22.7 | 0.41 | 41–42 | 30.0–30.7 | 17.8–19.5 |
| 22 | 30.9 | 4.0 | 23.8 | 0.53 | 42 | 30.7 | 13.0 |
| 23 | 35.1 | 1.8 | 26.3 | 0.24 | 43 | 31.5 | 21.7 |
| 24 | 35.0 | 2.6 | 26.4 | 0.35 | 45 | 32.9 | 18.6 |
| 25 | 34.8 | 3.1 | 26.4 | 0.41 | more than 45 | more than 32.9 | more than 15.9 |
| 26 | 35.2 | 4.0 | 27.0 | 0.53 | more than 45 | more than 32.9 | more than 11.1 |

From the comparison of the values of flameproof effect (C-A/B) in Table 4, it can be seen that a synergistic effect between phosphorus and chlorine is obtained by further adding a small amount of CVP.

Figure 2:
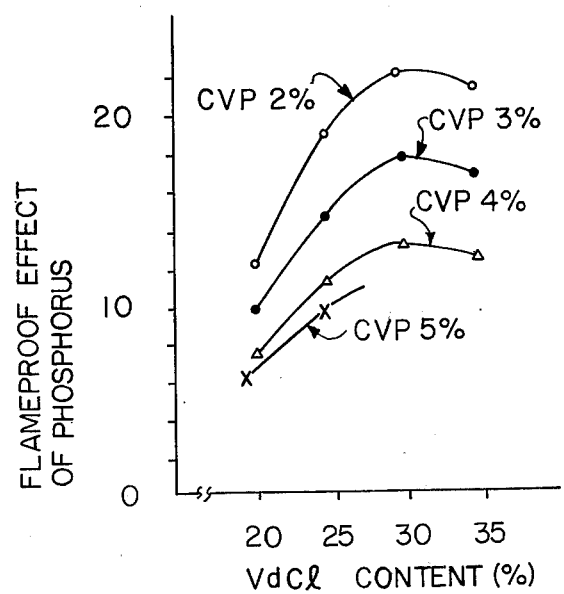

The flameproof effect of phosphorus of modacrylic fibers of AN-VdCl-CVP copolymer are plotted against CVP content and also against VdCl content in FIG. 1 and FIG. 2, respectively.

From Tables 3 and 4 and FIG. 1, it can be seen that the flameproof effect of the phosphorus in CVP alone is extremely weak, and even when it is copolymerized in an amount of 30 percent by weight, sufficient flameproof property cannot be given. However, when it exists together with VdCl, its effect becomes synergistic, the most pronounced effect can be obtained particularly when 25 percent by weight or more of VdCl and 3 percent by weight or less of CVP are existent, and incorporation of CVP monomer over the above-mentioned value is not preferable because it does not increase the effect but on the other hand causes cohesion of filaments due to heat. Further when the content of VdCl is less than 25 percent by weight, sufficient flameproof property cannot be obtained even when CVP monomer is copolymerized.

In respect of the flameproof property and the synergistic property obtained by the combination of chlorine with phosphorus, it is preferable that the content of VdCl is in the range of 25 – 40 percent by weight. Further, it is possible to increase the flameproof property by increasing the content of VdCl. The increase of the VdCl content over 40 percent by weight is, however, not preferable because the heat-shrinking property and dyeability are reduced as in the case of two component system consisting of AN and VdCl, and minimum concentration of nitric acid capable of dissolving polymers becomes larger.

The above-mentioned AN-VdCl-CVP copolymer gives fibers having superior flameproof property but resultant fibers are inferior somewhat in dyeability and brittle somewhat in the fiber nature. On this account, incorporation of a copolymerizable ethylenically unsaturated compound in an amount of 10 percent or less or preferably 2 – 5 percent, is advantageous. Further it is advantageous to incorporate 1 percent or less, or preferably 0.1 to 0.5 percent of another copolymerizable ethylenically unsaturated compound having a dye site for a basic dye in order to increase its dyeability.

The former copolymerizable ethylenically unsaturated compound referred to herein include acrylic acid, methacrylic acid, methyl acrylate, ethyl acrylate, methyl methacrylate, acrylamide, methacrylamide, vinyl acetate.

It is preferable to use as the latter compound having a dye site, vinylsulfonic acid, styrenesulfonic acid, allylsulfonic acid, methallylsulfonic acid, or sodium, potassium or ammonium salts thereof.

The copolymer having a composition of the present invention can be readily prepared by using a well known redox catalyst such as potassium persulfate, sodium bisulfite, or the like by way of a solution-, emulsion- or suspension-polymerization manner.

With regard to polymerization type, any of batch process, semi-continuous process and continuous process can be used but in order to obtain superior fibers having uniform distributions of composition and polymerization degree, a continuous emulsion polymerization process of perfect mixing type is most perferable where monomers, water, an emulsifier, a catalyzer, etc. are continuously added to the inside of a polymerization vessel and resultant polymers are continuously taken out as a latex.

According to a conventional process, it is possible to obtain a polymer. Namely, for example, a composition consisting of 100 parts by weight of monomers, 400 – 500 parts by weight of water, 1.0 – 2.0 parts by weight of an emulsifier, 0.2 – 1.0 parts by weight of potassium persulfate and 0.2 – 4.0 parts by weight of sodium bisulfite was continuously charged to a polymerization vessel and polymerized at a temperature of 10° – 30°C for a retention time of 3 to 15 hours. Resultant polymer in latex form was continuously taken out and subjected to salting-out, water washing and drying to obtain polymer.

In the production of the synthetic fibers of the composition of the present invention, dimethyl formamide or concentrated nitric acid can be used. However, dimethyl formamide has disadvantage in the point that it is expensive, not easily available, liable to color polymers by the decomposition during the operation, and its recovery is not easy due to its high boiling point. On this account, fibers are produced by using a concentrated nitric acid, as a solvent.

Thus a copolymer containing 50 percent by weight or more, of AN, 25 percent by weight or more of VdCl, 3 percent by weight or less of CVP obtained according to the above-mentioned various processes, is dissolved in an aqueous solution of a concentrated nitric acid at a temperature of 0°C or less to give a transparent colorless spinning solution having a viscosity of about 800 – 1000 poises at 0°C which is extruded into a coagulation bath of nitric acid having about a half of the concentration of the solvent nitric acid to coagulate into filaments. Resultant filaments are washed with water, stretched by using a boiling water bath at 100°C, a steam of atmospheric pressure or a steam of high pressure, and dried at a temperature higher than 90°C to obtain transparent, lustrous fibers.

The minimum concentrations of nitric acid capable of dissolving AN-VdCl-CVP copolymer of the present invention are shown in Table 5.

Table 5

| Composition of copolymer % by weight | | | | Minimum concentration of nitric acid capable of dissolving copolymer (%)* |
|---|---|---|---|---|
| AN | VdCl | CVP | Other mono-mer(s) | |
| 68.5 | 25 | 3.0 | 3.5 | 65 |
| 66.2 | 28 | 2.8 | 3.0 | 67 |
| 64.0 | 32 | 2.5 | 1.5 | 70 |
| 58.0 | 34 | 3.0 | 5.0 | 71 |
| 57.8 | 36 | 2.8 | 3.5 | 73 |

*See Table 1

Thus it is possible to select the concentration of nitric acid according to the composition of polymer (mainly content of VdCl) but it is preferable to use as low a concentration of nitric acid as possible in the range of 65 – 90 percent, perferably 70 – 85 percent, depending upon the solubility of polymer.

In general, a nitric acid having a concentration of more than 90 percent is not preferable because in addition to the problem regarding the material of production apparatus, the cost of solvent becomes expensive due to the high cost for concentrating nitric acid since the concentration of nitric acid in the azeotropic mixture thereof with water is in the range of 66.3 – 66.5 percent, and hence such a concentration is necessary to be elevated. Moreover, the higher the concentration of nitric acid, the more difficult the removal of nitrous acid. On this account, the use of higher concentrated nitric acid is not preferable because polymers are liable to undergo degradation and become a cause of relatively wide fluctuation of properties of products.

The present invention is further illustrated by the following non-limitative examples.

EXAMPLE 1

A copolymer of AN-VdCl-CVP having following compositions was continuously charged to a 10*l* three neck flask from one side under such condition that water ratio was 1:5, sodium lauryl sulfate was 1.0 percent by weight relative to monomer, catalyst was potassium persulfate (KPS) and sodium bisulfite (SBS), pH was 2.5, temperature was 25°C and a mean retention time was 4 hours, and polymer latex was taken out from the other side. After salting out with calcium chloride, resultant polymer was filtered, dehydrated, washed with water and dried to obtain polymers as shown in Table 6.

Table 6

| Co-polymer No. | Composition of monomer charged % | | | Catalyst composition % relative to monomer | | Copolymer composition (% by weight) | | | Percentage of polymerization (%) | DM[1] | Minimum[2] concentration of nitric acid capable of dissolving copolymer (%) |
|---|---|---|---|---|---|---|---|---|---|---|---|
| | AN | VdCl | CVP | KPS | SBS | AN | VdCl | CVP | | | |
| A-1 | 61 | 35 | 4 | 0.75 | 1.65 | 61.8 | 35.2 | 3.0 | 74.2 | 1327 | 74 |
| A-2 | 66 | 30 | 4 | " | 2.10 | 66.1 | 30.9 | 3.0 | 52.0 | 1585 | 69 |
| A-3 | 71 | 25 | 4 | " | 3.20 | 70.7 | 26.5 | 2.8 | 59.8 | 1669 | 67 |

[1]$DM = \eta \text{ red} \times 1000 = \dfrac{\eta sp}{C} \times 1000 = \dfrac{\eta r - 1}{C} \times 1000$, solvent: dimethyl formamide

[2]See Table 1

Resultant polymer was dissolved in a concentrated nitric acid to prepare a spinning solution which was extruded from nozzles having 50 holes of 0.12 mm diameter into a dilute nitric acid to coagulate into filaments. Resultant flaments were washed with water, and stretched by 7 times by a steam at 100°C. After oiling, they were dried under tension through a hot air cylinder having a length of 3 m at 120°C and wound up on a pirn with a take-up speed of 35 m/min whereby transparent yarns were obtained. Spinning conditions for each run are shown in Table 7 and various physical properties of resultant fibers are shown in Table 8 and 9 and FIGS. 3 and 4.

Figure 3:
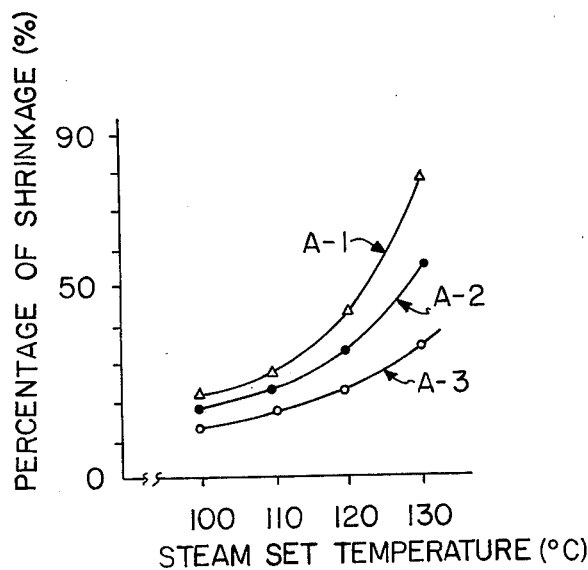

FIG. 3 shows a graph in which the precentages of shrinkage of AN-VdCl-CVP fibers are plotted against steam set temperatures. FIG. 4 shows a graph in which the dyeabilities (percentages of exhaustion) of AN-VdCl-CVP fibers are plotted against dyeing periods of time.

Dyeing conditions for each run were as follows:
Untreated fibers

| | | |
|---|---|---|
| Cehlon Green B* | 15% owf | (*Trade mark of a dye made by Dupont Co., USA) |
| Emal 10** | 2% owf | (**Trade mark of an anionic surfactant made by Kao Soap Co., Japan) |
| Scourol 400*** | 1% owf | (***Trade mark of a nonionic surfactant made by Kao Soap Co., Japan) |
| Liquor ratio | 1:40 | |
| Temperature | 100°C | |

Table 7

| Co-polymer No. | Nitric acid concentration for spinning solution | Amount* of copolymer charged | Viscosity of spinning solution at 0°C | Nitric acid concentration for coagulating solution |
|---|---|---|---|---|
| A-1 | 80% | 24.5 | 1000 poises | 41% |
| A-2 | 75% | 22.5 | 900 " | 37% |
| A-3 | 73% | 19.0 | 960 " | 35% |

*g/100 cc nitric acid

Table 8

| Co-polymer No. | Denier | Dry tenacity | | Dry elongation | Wet tenacity | | Wet elongation | Loop tenacity | | Loop elongation |
|---|---|---|---|---|---|---|---|---|---|---|
| A-1 | 6.1 | 3.46 | g/d | 12.2 % | 3.43 | g/d | 14.1 % | 0.57 | g/d | 6.14 % |
| A-2 | 5.9 | 4.09 | " | 13.7 " | 4.07 | " | 12.6 " | 0.80 | " | 7.27 " |
| A-3 | 5.8 | 4.15 | " | 12.7 " | 4.12 | " | 13.2 " | 0.92 | " | 7.40 " |

Table 9

| Co-polymer No. | Flameproof properties | | | | |
|---|---|---|---|---|---|
| | In copolymers | | Period of time of contact with flame (sec.) | Duration time of remaining flame (sec.) | Number of times of contact with flame |
| | Cl content | P content | | | |
| A-1 | 26.7 % | 0.40 % | 12.2 | 1.0 | 17 |
| A-2 | 23.5 " | 0.40 " | 7.1 | 2.6 | 14 |
| A-3 | 20.3 " | 0.37 " | 6.0 | 9.0 | 10 |

From the foregoing data, the fibers having compositions of A-1, A-2 and A-3, etc. are superior in flameproof property etc., but as seen from FIG. 4, their dyeability looks somewhat inferior.

EXAMPLE 2

Monomers of AN, VdCl, CVP, methyl acrylate (MA) and sodium methallylsulfonate having compositions shown in following Table 10, were respectively copolymerized under following conditions: Monomer to water ratio, 1:5; emulsifier, sodium lauryl sulfate, 1.2 percent relative to monomer; catalyst, KPS-SBS; pH, 2.5; temperature, 25°C; and mean retention time, 6 hours.

At first 0.4 percent aqueous solution of sodium lauryl sulfate was at a rate of 7.0 g/min, and monomers were at a rate of 5.6 g/min, respectively fed into a one l flask continuously where the mixture was stirred vigorously to emulsify the monomers. Then the resultant monomer emulsion, 0.52 percent aqueous solution of KPS, 1.6 percent aqueous solution of SBS and 0.128 percent aqueous solution of sulfuric acid were charged continuously into a 10l flask each at a rate of 7.0 g/min and polymerization was carried out. During that time, a polymer latex was taken out from teh other side and subjected to salting out. After the steps of filtration, dehydration, washing with water, and drying, polymers shown in Table 10 were obtained.

Table 10

| Copolymer No. | Composition of monomer charged % | | | | Analytical data of copolymer (%) | | | Percentage of polymerization | DM*1 | Minimum concentration of nitric acid capable of dissolving the copolymer(%)*2 |
| --- | --- | --- | --- | --- | --- | --- | --- | --- | --- | --- |
| | AN | VdCl | CVP | MA | AN | VdCl | CVP | | | |
| A-4 | 65.0 | 28.0 | 5.0 | 2.0 | 59.0 | 34.0 | 3.0 | 74.5 | 1320 | 73 |
| A-5 | 65.7 | 28.0 | 4.0 | 2.0 | 63.0 | 32.4 | 2.5 | 83.0 | 1260 | 70 |
| A-6 | 66.7 | 26.0 | 4.0 | 3.0 | 65.8 | 26.0 | 3.8 | 82.0 | 1100 | 67 |

*1 See Table 6
*2 See Table 1

In all runs, 0.65 percent of KPS and 2.0 percent of SBS relative to the monomers, were used as a polymerization catalyst. Further sodium methallylsulfonate was not used in A-4 but it was used in A-5 and A-6 in an amount of 0.3 percent relative to the monomers.

In runs A-4 and A-5, three stainless impellers were used at 600 r.p.m. and in A-6, TK homomixer was used at 3000 r.p.m.

Resultant copolymers were subjected to spinning as in Example 1 and transparent fibers having superior lustre were obtained. Spinning conditions for each runs are shown in Table 11.

Table 11

| Copolymer No. | Nitric acid concentration for spinning solution | Amount of* copolymer charged | Viscosity of spinning solution at 0°C | Nitric acid concentration for coagulating bath |
| --- | --- | --- | --- | --- |
| A-4 | 80% | 24.0 | 980 poises | 40% |
| A-5 | 75" | 25.0 | 780 " | 37" |
| A-6 | 72" | 26.5 | 830 " | 35" |

*See Table 7

Properties of resultant fibers are shown in Table 12 and FIGS. 5 and 6.

FIG. 5 shows a graph in which the percentage of shrinkage of AN-VdCl-CVP-MA fibers are plotted against steam set temperatures. FIG. 6 shows a graph in which the dyeabilities (percentages of exhaustion) of AN-VdCl-CVP-MA fibers are plotted against dyeing periods of time.

Dyeing conditions for each run were as follows:
Fibers set at 110°C
Ceblon Green B 15% owf
Emal 10 2% owf
Scourol 400 1% owf
Liquor ratio 1:40
Temperature 25°C Table 12

| Copolymer No. | Flameproof properties | | | | |
| --- | --- | --- | --- | --- | --- |
| | Cl content | P content | Period of time of contact with flame (sec.) | Duration time of remaining flame (sec.) | Number of times of contact with flame |
| A-4 | 25.7% | 0.40% | 13.0 | 1.0 | 15 |
| A-5 | 24.5" | 0.33" | 10.0 | 2.7 | 13 |
| A-6 | 20.2" | 0.51" | 5.1 | 6.0 | 9 |

From the foregoing data is has been confirmed that the fibers having the compositions of A-4 and A-5 have flameproof properties and at the same time properties not inferior to those of acrylonitrile polymer fibers. However, A-6 showed notable cohesion at the time of drying.

EXAMPLE 3

Monomers of AN, VdCl, CVP, MA and sodium allylsulfonate copolymer having compositions shown in following Table 13 were, respectively, copolymerized under following conditions: Monomer to water ratio, 1:4; catalyst, sodium hydroxylaminemonosulfonate (3.0 percent)-ammonium bisulfite (4.0 percent) redox type; suspension stabilizer, 0.2 percent polyvinyl alcohol (supplied from Kurare Co. with a trade name Poval No. 1500) (0.2 percent); sulfuric acid (0.16 percent); each percent being based on the monomers; pH, 2.5; polymerization temperature, 30°C; mean retention time, 10 hours.

At first 0.2 percent aqueous solution of Poval NO. 1500 and monomers were continuously charged in a 1l flask, each at the rate of 3.3 g/min, agitating the mixture vigorously to make the monomer to suspend sufficiently. Resultant monomer suspension, and each aqueous solution of sodium hydroxylaminemonosulfonate, ammonium bisulfite and sulfuric acid were continuously charged to 10l flask and polymerization was carried out while at the same time a polymer slurry was taken out from the other side of the flask. After filtration of the slurry, resultant polymers were washed with water, dehydrated and dried to obtain polymers. The results are shown in Table 13.

Table 13

| Copolymer No. | Composition of monomer charged*1 | | | | Polymer analysis | | | Percentage of polymerization (%) | DM*2 | Minimum con-*3 centration of nitric acid capable of dissolving copolymer |
| --- | --- | --- | --- | --- | --- | --- | --- | --- | --- | --- |
| | AN | VdCl | CVP | MA | Acrylonitrile | Vinylidene chloride | CVP | | | |
| A-7 | 67.5 | 25 | 5 | 2.5 | 66.5 | 26.7 | 3.0 | 78 | 1120 | 67% |

Table 13-continued

| Co-polymer No. | Composition of monomer charged*1 | | | | Polymer analysis | | | Percentage of polymerization (%) | DM*2 | Minimum concentration*3 of nitric acid capable of dissolving copolymer |
| --- | --- | --- | --- | --- | --- | --- | --- | --- | --- | --- |
| | AN | VdCl | CVP | MA | Acrylonitrile | Vinylidene chloride | CVP | | | |
| A-8 | 64.0 | 28 | 5 | 2.5 | 61.7 | 29.3 | 2.9 | 76 | 1200 | 71% |

*1 0.5% sodium methallylsulfonate was included.
*2 See Table 6
*3 See Table 1

Resultant polymers were subjected to spinning as in Example 1 and transparent fibers having superior lustre were obtained.

Various spinning conditions are shown in Table 14.

Table 14

| Co-polymer No. | Concentrations of nitric acid for spinning solution | Amount of* copolymers charged | Viscosities of spinning solution | Concentration of nitric acid for coagulation bath |
| --- | --- | --- | --- | --- |
| A-7 | 70% | 31 g | 940 poises | 38% |
| A-8 | 75" | 29 " | 830 " | 39" |

Test result of flameproof properties of resultant fibers are shown in Table 15.

Table 15

| Co-polymer No. | Cl content | P content | Period of time of contact with flame (sec.) | Duration time of remaining flame (sec.) | Number of times of contact with flame |
| --- | --- | --- | --- | --- | --- |
| A-7 | 20.4% | 0.40% | 4.8 | 7.3 | 8 |
| A-8 | 22.3" | 0.39" | 7.0 | 3.4 | 11 |

Resultant fibers having compositions of A-7 and A-8 had superior flameproof properties as in Example 2 and properties not inferior to those of acrylonitrile synthetic fibers.

EXAMPLE 4

Monomers of AN, VdCl, CVP, acrylamide (AA) and sodium methallylsulfonate each having following compositions were copolymerized according to following conditions: monomer: water ratio 1:4; polymerization catalyst, sodium hydroxylamine monosulfonate (3.0 percent)-ammonium bisulfite (4.0 percent) redox catalyst; suspension stabilizer, Poval No. 1500 (0.2 percent); sulfuric acid (0.16 percent); each percent being based on monomers; pH, 2.5; polymerization temperature, 30°C; mean retention time, 8 hours.

At first, an aqueous solution of Poval No. 1500 and monomers were continuously charged into a 500 ml flask with vigorous stirring to give a suspension.

Resultant suspension of monomers, and each aqueous solution of sodium hydroxylamine monosulfonate, ammonium bisulfite and sulfuric acid were continuously charged to a 10$l$ flask from an inlet to conduct polymerization while taking out from an outlet, polymer slurry which was filtered, washed with water, dehydrated and dried to give polymers indicated in Table 14.

These polymers were dissolved in purified 75 nitric acid cooled at 0°C to give a spinning solution which was then extruded from a spinneret into 35 percent nitric acid coagulation bath maintained at 0°C to effect coagulation. Resultant fibers were washed with water, stretched in a hot water at 90°C and dried. Then the fibers were subjected to heat-treatment for 10 minutes in a saturated steam at 120°C. The fibers thus obtained showed superior dyeability, transparency and flameproof property (self-extinguishing property).

Table 14

| Co-polymer No. | AN | VdCl | CVP | AA | Sodium methallylsulfonate | Period of time of contact with flame (sec.) | Duration time of remaining flame (sec.) | Number of times of contact with flame |
| --- | --- | --- | --- | --- | --- | --- | --- | --- |
| A-9 | 62.0 | 30.5 | 2.5 | 4.5 | 0.5 | 4.9 | 2.0 | 14 |
| A-10 | 59.5 | 33.0 | 2.0 | 5.0 | 0.5 | 6.7 | 4.9 | 12 |

What is claimed is:

1. A modacrylic synthetic fiber prepared from a polymer composition consisting essentially of polymerized units of
   a. at least 50 percent by weight based on the composition of acrylonitrile;
   b. at least 25 percent by weight based on the composition of vinylidene chloride;
   c. 0.1 to 3 percent by weight based on the composition of bis(2-chloroethyl) vinylphosphonate; and
   d. at least one ethylenically unsaturated compound copolymerizable therewith, present in an amount of up to 10 percent by weight and which includes at least one ethylenically unsaturated monomer having a dye site therein for a basic dye, said monomer having a dye site being present in an amount of up to 1 percent by weight.

2. A modacrylic synthetic fiber of claim 1 wherein said copolymerizable ethylenically unsaturated compound having a dye site is vinylsulfonic acid, styrenesulfonic acid, allylsulfonic acid, methallylsulfonic acid, or sodium, potassium or ammonium salts thereof.

3. A modacrylic synthetic fiber prepared from a polymer composition consisting essentially of 50–70 percent by weight based on the composition of acrylonitrile, 25–40 percent by weight based on the composition of vinylidene chloride and 1–2.5 percent by weight based on the composition of bis(2-chloroethyl) vinylphosphonate, 2–5 percent by weight based on the composition of methyl acrylate and 0.1–1 percent by weight based on the composition of sodium methallylsulfonate.

4. A modacrylic synthetic fiber prepared from a polymer composition consisting essentially of 50–70 percent by weight based on the composition of acrylonitrile, 25–40 percent by weight based on the composition of vinylidene chloride and 1–2.5 percent by weight based on the composition of bis(2-chloroethyl) vinylphosphonate, 2–10 percent by weight based on the composition of acrylamide and 0.1–1.0 percent by weight based on the composition of sodium methallylsulfonate.

* * * * *